United States Patent [19]

Andersson et al.

[11] Patent Number: 5,018,249
[45] Date of Patent: * May 28, 1991

[54] DEVICE FOR THE EJECTION OF BOXES THROUGH THE EXIT OF A CONTAINER AND A BOX ADAPTED FOR USE IN SUCH A DEVICE

[75] Inventors: Nils A. T. Andersson, Järfälla; Bo S. Lindgren, Spanga, both of Sweden

[73] Assignee: U.S. Philips Corporation, New York, N.Y.

[*] Notice: The portion of the term of this patent subsequent to Mar. 17, 2004 has been disclaimed.

[21] Appl. No.: 94,048

[22] Filed: Sep. 3, 1987

Related U.S. Application Data

[60] Continuation of Ser. No. 904,089, Sep. 4, 1986, abandoned, which is a division of Ser. No. 604,279, Apr. 26, 1984, Pat. No. 4,650,092.

[30] Foreign Application Priority Data

May 3, 1983 [SE] Sweden ................................ 8302508

[51] Int. Cl.⁵ ................................................ B65H 3/32
[52] U.S. Cl. .................................... 221/222; 221/226; 221/231; 414/797.7
[58] Field of Search ................... 221/26, 42, 222, 231, 221/226, 230, 217, 258, 279; 414/123, 129, 128, 125, 120; 206/509, 512, 511

[56] References Cited

U.S. PATENT DOCUMENTS

| | | | |
|---|---|---|---|
| 3,391,827 | 7/1968 | Govatsos | 221/226 X |
| 3,455,484 | 7/1969 | Edwards | 221/222 |
| 4,650,092 | 3/1987 | Andersson et al. | 221/231 X |

Primary Examiner—David H. Bollinger
Attorney, Agent, or Firm—Robert J. Kraus

[57] ABSTRACT

A device (1) for ejection of boxes (30) through an exit (3) of a container (2). Such a device (1) may be used for the ejection of chaff for the purpose of radar jamming. The device (1) is provided with gear wheels (13, 13') located adjacent to the exit (3). In order to eject chaff boxes (30) the gear wheels (13, 13') engage with peripherally located gear means (37, 38) on the boxes (30). Ejection by means of such a gear arrangement enables the number of boxes (30) released and the time interval between subsequent releases to be controlled very accurately.

11 Claims, 3 Drawing Sheets

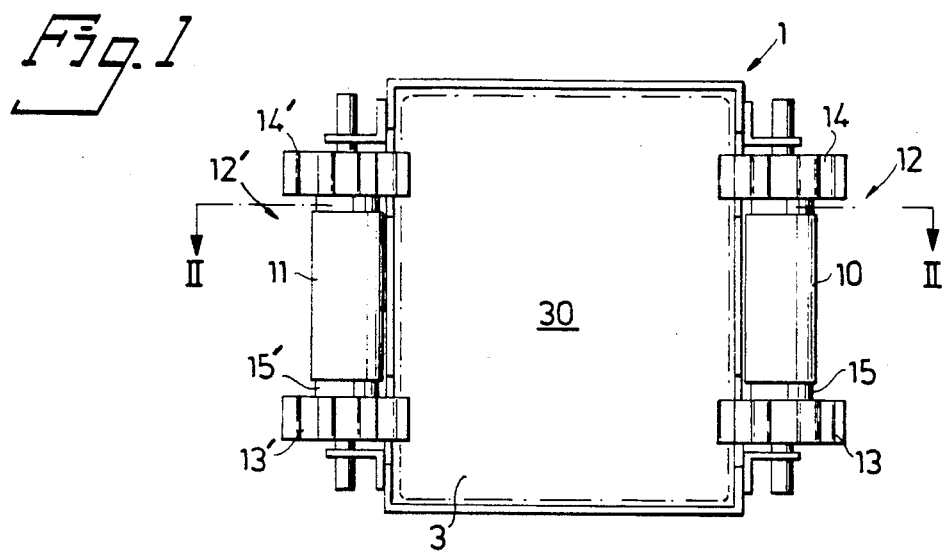
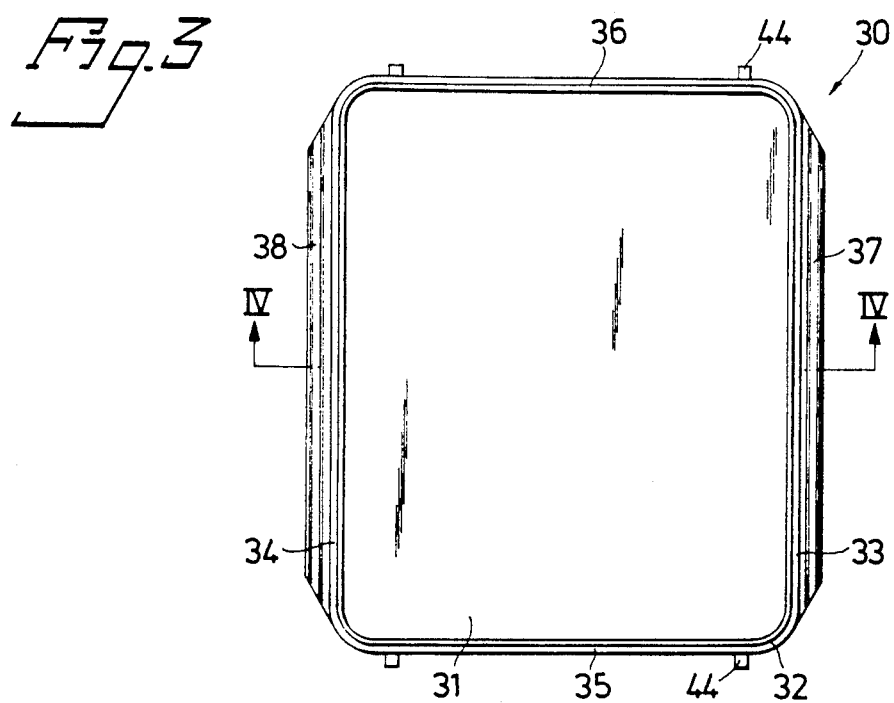
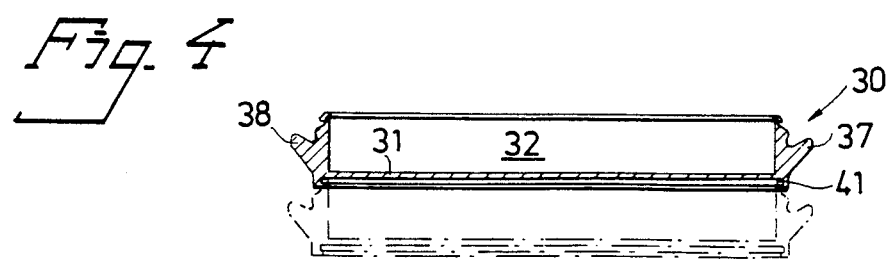

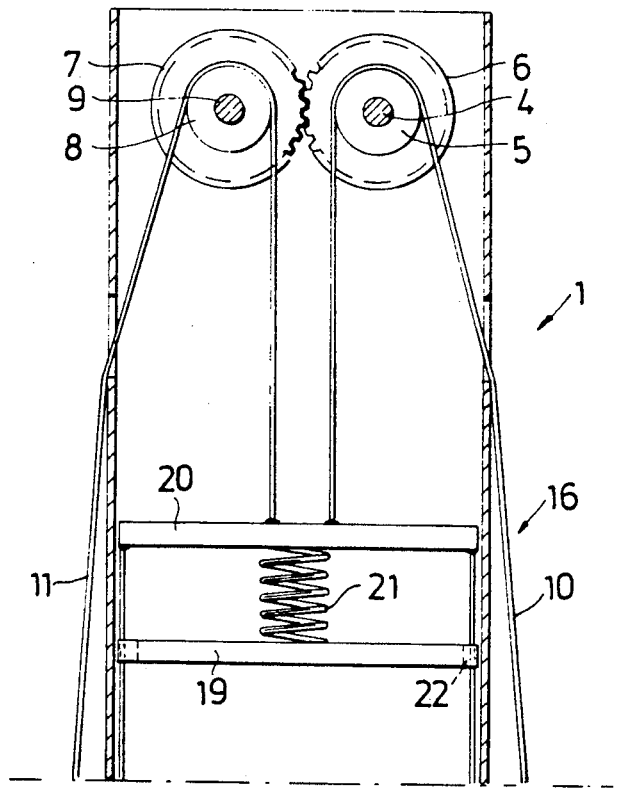
Fig. 2
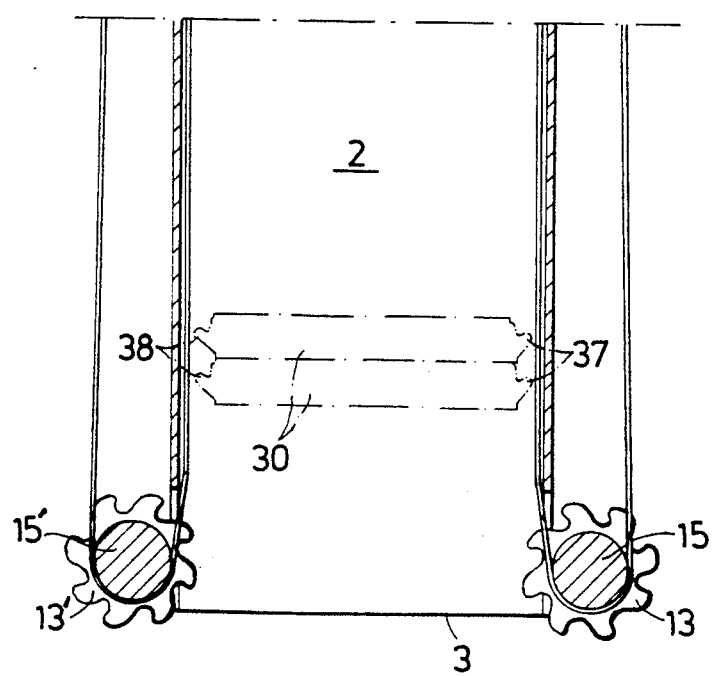

DEVICE FOR THE EJECTION OF BOXES THROUGH THE EXIT OF A CONTAINER AND A BOX ADAPTED FOR USE IN SUCH A DEVICE

This is a continuation of application Ser. No. 904,089 filed Sept. 4, 1986, now abandoned, which is a divisional of application Ser. No. 604,279 filed Apr. 26, 1984, now U.S. Pat. No. 4,650,092.

BACKGROUND OF THE DISCLOSURE

The invention relates to a device for ejection of boxes through an exit of a container, comprising a transport mechanism which ejects the boxes one by one.

In a known device of the above kind (U.S. Pat. No. 2,954,948) the boxes are arranged in a vertical stack in an upstanding container. Downward movement of the boxes in the container is obtained by the force of gravity. Just before ejection of one of the boxes the remaining stack of boxes tends to tilt with respect to the container so that there exists a considerable risk that the remaining boxes will jam in the container. The risk of jamming increases when the container is somewhat inclined with regard to the direction of the force of gravity during ejection.

SUMMARY OF THE INVENTION

It is an object of the invention to provide a device for ejection of boxes wherein the risk of jamming of the boxes in the container is avoided in all positions of the container with respect to the direction of the force of gravity.

In accordance with the invention the transport mechanism is provided with a first gear means located adjacent to the exit and engageable with second gear means which is part of each of the boxes.

An additional object of the invention is to provide a device for ejection of boxes which causes a final push to the box which is ejected.

This object of the invention is accomplished by including each of the boxes in a train of boxes which is slidable in the container by the transport mechanism, adjacent boxes remaining attached to each other by flexible latching means on each box during transport up to the first gear means. The first gear means disengages adjacent boxes by unlocking the flexible latching means while subsequently ejecting one of each two adjacent boxes and retaining the other one by cooperation with said gear means.

A further object of the invention is to provide a device for ejecting boxes wherein the boxes are protected against damage during transport in the container.

This object of the invention is accomplished by providing as part of the transport mechanism a piston which is slidable in the container and which is spring-biased against a train of boxes.

Still another object of the invention is to provide a box with a particular shape which is adapted to the first gear means of the transport mechanism.

This object of the invention is achieved by including in the box two opposite side walls which include the second gear means.

BRIEF DESCRIPTION OF THE DRAWING

The invention will be described in more detail with reference to the accompanying drawing in which FIG. 1 shows a frontview of the ejection device, FIG. 2 shows a longitudinal cross-section of the ejection device along the line II—II in FIG. 1, FIG. 3 shows a box adapated to the ejection device according to FIGS. 1 and 2, FIG. 4 shows a cross-section through the box according to FIG. 3 along the line IV—IV.

DESCRIPTION OF THE PREFERRED EMBODIMENT

Figure 5A:
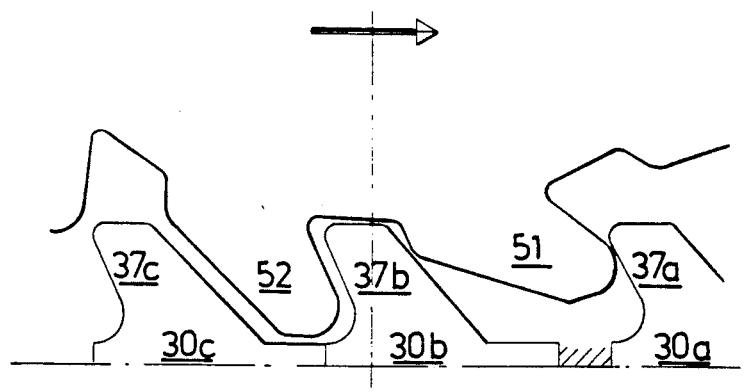
FIGS. 5a-c show cooperation between first and second gear means in different positions during the separation and ejection phase.

In FIGS. 1 and 2 an ejection device 1 for dispensing chaff is shown which comprises a container 2 for chaff boxes 30 and a drive mechanism (elements 4–21) for driving a train of boxes to an exit 3 of the container 2 and for the separation and ejection of boxes 30 at the exit 3. For transporting the slidable train of boxes 30 and separating them one-by-one, a driving motor (not shown) drives a first shaft 4 on which a belt pulley 5 and a gear wheel 6 are fixedly arranged. The gear wheel 6 cooperates with a similar gear wheel 7 which together with a belt pulley 8 is fixedly arranged on a second shaft 9 arranged parallel to the first shaft 4. The shafts 4 and 9 are arranged adjacent to the end of the container situated farthest from the exit 3 of the container. Adjacent to exit 3 the first gear means includes gear arrangements 12 and 12' arranged opposite to each other. The gear arrangements 12 and 12' comprise pairs of gear wheels 13, 14, and 13', 14' respectively (FIG. 1). The pairs are rigidly arranged on parallel common shafts 15 and 15'; respectively. The gear wheels 13, 14 and the common shaft 15 may be formed as one piece as may the gear wheels 13', 14' and the common shaft 15'. Driving belts 10 and 11 respectively are connected to the two gear units 12 and 12'. The ends of the driving belts 10 and 11 are attached to a compressible piston 16 which is slidably arranged in the container 2. The piston 16 comprises two parallel plates 19 and 20 with a spring 21 therebetween. In the illustrated embodiment the ends of the belts 10 and 11 are fixed to the plate 20 situated farthest from the exit 3 of the container 2. The front plate 19 is provided with recesses 22 to enable passage of the driving belts 10 and 11. In FIG. 2 the position of two chaff boxes 30 has been indicated with dash-dot lines. In reality, however, the complete container space between the piston 16 and the exit 3 is filled with chaff boxes 30.

FIGS. 3 and 4 show a chaff box 30 adapted to the described transport mechanism. The box 30 includes a bottom plate 31 and four side walls 32. Side walls 32 are constituted by two oppositely arranged straight parallel side walls 33 and 34 and two side walls 35 and 36 connecting the parallel side walls 33 and 34.

The bottom plate 31 of box 30 closes an adjacent box. The adjacent box is indicated with dash-dot lines in FIG. 4. Chaff of several lengths adapted to different frequency ranges is kept in the boxes. The chaff may be of, for example, foil or glassfiber type.

The opposite parallel side walls 33 and 34 are provided with second gear means 37 and 38. In the embodiment shown the second gear means consist of oblong projecting parts 37 and 38 integrally formed in the side walls 33 and 34. The projecting parts 37 and 38 are somewhat inclined. Alternatively, each of the projecting parts 37 and 38 may be constituted by more than one gear element. For example a separate gear element may be provided for each of the first gear wheels 13, 14, 13', 14' arranged adjacent to the exit 3 of the container 2.

In order to obtain a reliable coupling of adjacent boxes the side walls 32 may be tapered close to the boxes in front of and behind it in such a way that the boxes can be nested in each other. As an alternative, the side walls 32 may be given a somewhat conical shape in order to obtain a reliable coupling between the boxes. Moreover, the boxes 30 are provided with flexible latching means in order to connect adjacent boxes to each other. A latching means comprises, as is most apparent from FIGS. 6a and 6b, a flexible projection 41 formed in the side walls 32 of a box and a recess 42 likewise formed in the side walls 32 of a box. In an assembled position a projection 41 in one box 30 engages with a recess 42 in an adjacent box 30. A further flexible projection 43 may be arranged adjacent to the projection 41. This projection 41 constitutes a point of action for activating the latching means.

Furthermore ridges 44 may be provided on the outside of the side walls 32 (FIG. 3). These ridges cause a reduction of the friction between a train of attached boxes 30 and the walls of the container 2.

The operation of the ejection device will now be described in more detail with reference to FIGS. 1, 2, 5 and 6.

The container 2 is filled by rotating the gear wheels 12 and 12' so that a train of attached chaff boxes 30 can be inserted in the container 2 through exit 3 and pushed against the piston 16. The gear wheels 12 and 12' are then rotated so that they engage with the second gear means on the box being situated closest to the container exit 3. The compressible piston 16 biases the train of boxes in the direction towards the exit 3.

Ejection of chaff boxes is initiated by starting a drive motor which rotates the shaft 4 supporting the belt pulley 5 and the gear wheel 6. The gear wheel 6 rotates the gear wheel 7 and the belt pulley 8. The belt pulley 5 drives the belt 10 which via the shaft 15 rotates the gear wheels 13 and 14 of first gear means 12. The belt pulley 8 in the same way drives the belt 11 which via a shaft 15' rotates the gear wheels 13' and 14' of first gear means 12'. For guiding of the driving belts the drive mechanism may be supplemented with guide rollers. For example, guide rollers which serve to guide the belts towards the outer walls of the container may be arranged on the outside of the container close to the first gear means. The gear wheels 13, 14, 13', 14' engage with the corresponding second gear means 37, 38 of the chaff boxes and ensure that the boxes 30 are ejected one by one. The compressible piston 16 exerts a force on the train of boxes in the direction towards the container exit and ensures by means of its compressibilty that the boxes, the gear means 12, 12', the belts 10, 11 and even the further parts of the drive mechanism are not subjected to damaging forces.

The cooperation between the first gear means of the transport mechanism and the second gear means of the boxes will now be described in more detail with reference to FIGS. 5 and 6.

FIG. 5a shows a position in which a tooth 52 of a gear wheel 13, 14, 13', 14' has just entered into the space between the gear means 37b and 37c, while the tooth 51 on one hand gives the box 30a situated closest to the exit 3 a final push out of the container 2 and on the other hand prevents the box 30b from leaving the container 2. During the counter-clockwise rotation of the gear wheel to the position shown in FIG. 5b the chaff boxes 30b and 30c are moved closer to the exit and the tooth 52 opens the latching means by pressing aside the projection 43. The latching means are shown in more detail in FIGS. 6a and 6b, FIG. 6b showing a position which corresponds to that of FIG. 5b.

Figure 5B:
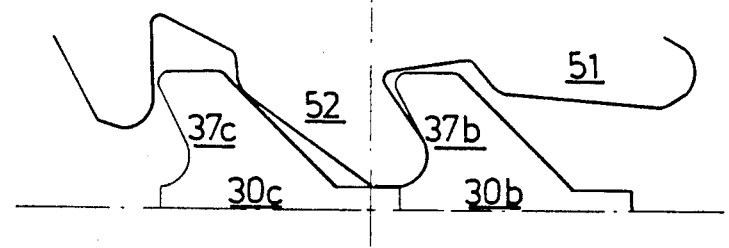
Figure 6B:
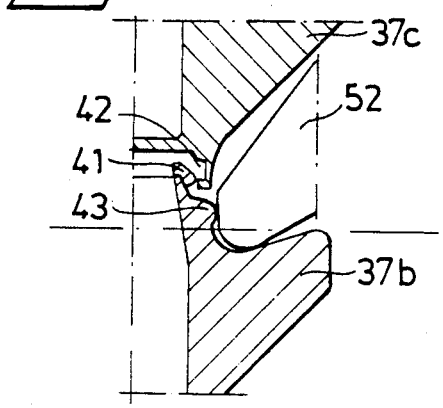
FIGS. 6a-b show the latching means connection two adjacent boxes, FIG. 6a showing the situation before separation of adjacent boxes corresponding to FIG. 5a and FIG. 6b showing the situation during separation of adjacent boxes according to FIGS. 5b and 5c.
Figure 6A:
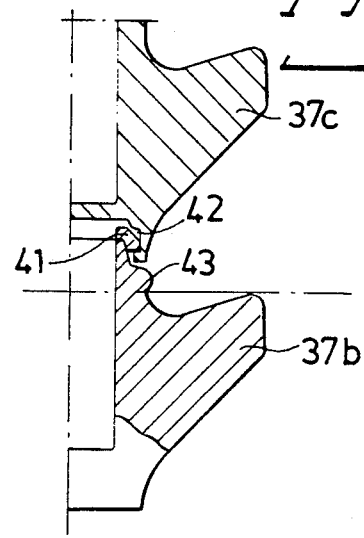

When in the position shown in FIG. 5b the tooth 52 begins to engage both the gear means 37b in front of and the gear means 37c behind the tooth.

Figure 5C:
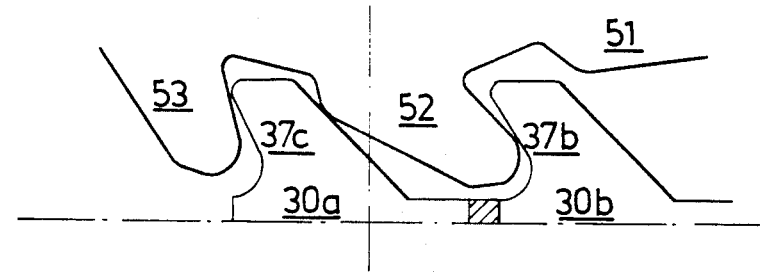

During the counter-clockwise rotation of the gear wheels from the position shown in FIG. 5b to the position shown in FIG. 5c the tooth 52 tends to increase the distance between the gear means 37b and 37c, so that the box 30b situated closest to the exit 3 starts to separate from the train of chaff boxes situated behind it. At the same time the tooth 53 ensures that the train of chaff boxes is moved towards the exit.

During the continued counter-clockwise rotation of the gear wheels from the position shown in FIG. 5c the tooth 52 moves nearer to the position of the tooth 51 in FIG. 5a. The box 30b situated closest to the exit is completely released from the boxes lying behind during the last mentioned rotation and is given a push out of the container by the tooth 52.

The ejection of additional boxes is performed in the same way as described above for the box 30b.

In the embodiment shown the exit is provided with a total of four gear wheels 13, 14, 13', 14'. However, it is possible to increase or decrease the number of gear wheels. For example, embodiments with only one or two gear wheels are possible.

The driving of the gear wheels 13, 14, 13', 14' at the exit 3 of the container may be performed step by step or continuously during a limited period of time.

In the described embodiment driving belts are used for driving of the gear wheels at the exit 3 of the container. These belts may be perforated and cooperate with belt pulleys provided with teeth. Alternatively, the belt driving may be replaced by a wire or chain driving.

Furthermore, it is possible to replace the described piston transport by other constructions. In one simple variant the piston is omitted and the gear wheels 13, 13' serve both for the transport and for the ejection. The driving motor may be located in direct connection with the gear means 12, 12' which may be coupled via further gear wheels.

In addition it is to be noted that the described principle for ejection of boxes from a container may be used also in devices other than chaff ejection devices. The principle may be used for example in vending machines for food articles or assembly lines for sequentially feeding out products from the line.

What is claimed is:

1. An improved apparatus for dispensing packages from a moving container having an opening through which the packages are to be ejected, wherein the improvement comprises a transport mechanism for controllably ejecting the packages indepedently of the orientation of the container with respect to the force of gravity, said transport mechanism including:
   (a) engagement means, for performing an interlocking function, attached to each package;
   (b) indexing means located adjacent to the opening of the container, said indexing means comprising:

1. engaging means for interlocking with the engagement means of the package closest to the opening, thereby securing the package in place; and
2. means for controllably moving the engaging means through a predefined cycle causing said engaging means to eject the closest package through the opening with sufficient force to overcome the force of gravity, after interlocking with the engagement means of the next closest package; and (c) advancing means coupled to the indexing means for cooperating with said indexing means to positively advance the packages toward the engaging means synchronously with said movement of said engaging means.

2. An apparatus as in claim 1 where the engaging means comprises rotatable gear means.

3. An apparatus as in claim 1 or 2 where each of the packages has two opposite side walls, each of said side walls including one of the engagement means.

4. An apparatus as in claim 1 or 2 where each of the packages is adapted for containing chaff and for releasing said chaff when the package is ejected from the container.

5. An apparatus as in claim 4 where each of the packages has an open side shaped for cooperating with a facing side of the adjacent package to effect closure of said open side when the adjacent packages are in contact with each other.

6. An apparatus as in claim 1 or 2 where the advancing means comprises respective connecting means for detachably connecting each package to an adjacent package, and where the engaging means is adpated to disconnect the connecting means connecting the package closest to the opening from the next closest package during the predefined cycle.

7. An apparatus as in claim 6 where the engaging means includes gear teeth and where, during each predefined cycle, the means for controllably moving the engaging means effects movement of said gear teeth to positively engage the engagement means of the package, to advance said package and all other packages connected together by the connecting means toward the opening, to disconnect the connecting means connecting the package closest to the opening from the next closest package, and to forcefully eject said closest package through the opening.

8. An apparatus as in claim 7 where the connecting means comprises a latching member adapted to be unlatched by one of the gear teeth of the engaging means.

9. An apparatus as in claim 6 where the advancing means includes a piston slidably arranged in the container for urging the packages toward the indexing means.

10. An apparatus as in claim 9 where the means for controllably moving the engaging means comprises driving means coupling said engaging means to the piston.

11. An apparatus as in claim 10 where the driving means comprises a driving belt.

* * * * *